(12) United States Patent
Nakada et al.

(10) Patent No.: US 7,184,382 B2
(45) Date of Patent: Feb. 27, 2007

(54) ENERGY BEAM IRRADIATING APPARATUS

(75) Inventors: Katsuyuki Nakada, Tokyo (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 556 days.

(21) Appl. No.: 10/806,119

(22) Filed: Mar. 23, 2004

(65) Prior Publication Data

US 2004/0195526 A1 Oct. 7, 2004

(30) Foreign Application Priority Data

Mar. 24, 2003 (JP) .............................. 2003-079362

(51) Int. Cl.
*G11B 7/00* (2006.01)

(52) U.S. Cl. .................. 369/100; 250/492.1; 250/360; 250/75

(58) Field of Classification Search ................ 369/100, 369/126; 250/492.1, 492.2, 492.22, 492.3; 360/75

See application file for complete search history.

(56) References Cited

U.S. PATENT DOCUMENTS

| | | | |
|---|---|---|---|
| 6,307,826 B1 * | 10/2001 | Katsumura et al. | 369/101 |
| 6,686,597 B2 * | 2/2004 | Kumasaka et al. | 250/492.2 |
| 6,697,317 B2 * | 2/2004 | Hagiwara | 369/126 |
| 6,882,615 B2 * | 4/2005 | Katsumura | 369/275.4 |
| 6,933,508 B2 * | 8/2005 | Popiolkowski et al. | 250/492.1 |
| 7,113,360 B2 * | 9/2006 | Formato et al. | 360/75 |

2001/0052577 A1 12/2001 Aki et al.

FOREIGN PATENT DOCUMENTS

| JP | 04356912 A | * 12/1992 |
|---|---|---|
| JP | 2001-242300 | 9/2001 |

OTHER PUBLICATIONS

English Language Abstract of JP 2001-242300.

* cited by examiner

*Primary Examiner*—Thang V. Tran
(74) *Attorney, Agent, or Firm*—Greenblum & Bernstein, P.L.C.

(57) ABSTRACT

An energy beam irradiating apparatus includes a substrate holder, a moving stage, an energy beam irradiating mechanism, and a control unit. A disc-like substrate is attached to the substrate holder which includes a holder main part on which the disc-like substrate is mounted and a pressing plate, the disc-like substrate being held between the holder main part and the pressing plate with a formation region of an irradiation pattern on the disc-like substrate and a partial region of at least one of an outer edge and an inner edge of the disc-like substrate being exposed. The moving stage moves the substrate holder. The energy beam irradiating mechanism irradiates a surface of the disc-like substrate attached to the substrate holder with an energy beam. The control unit causes the moving stage to move based on a movement pattern with a reference point set in advance on the moving stage as a reference so that an irradiation pattern is formed on the surface of the disc substrate by irradiation with the energy beam. During formation of the irradiation pattern, the control unit calculates a center of the disc-like substrate based on at least one part of an outline of the exposed outer edge or inner edge of the disc-like substrate and sets the calculated center as the reference point.

4 Claims, 5 Drawing Sheets

ENERGY BEAM IRRADIATING APPARATUS

BACKGROUND OF THE INVENTION

1. Field of the Invention

This invention relates to an energy beam irradiating apparatus that forms an irradiation pattern on a disc substrate through irradiation with an energy beam.

2. Description of the Related Art

When manufacturing an optical recording substrate (optical disc), such as a CD or DVD, or a magnetic recording substrate for a hard disk apparatus, a stamper in whose surface fine pits and lands are formed is sometimes used. When manufacturing such a stamper, as one example irradiation with an energy beam is carried out using an energy beam irradiating apparatus such as the electron beam irradiation apparatus disclosed in Japanese Laid-Open Patent Publication No. 2001-242300 to form a latent image on a resist layer formed on a surface of a substrate (as one example a disc-like substrate), and fine pits and lands are formed in the resist layer by developing the resist layer. Next, after a metal layer has been formed, by nickel plating for example, on a surface of the substrate in which the fine pits and lands have been formed, the metal layer is peeled off, thereby manufacturing a stamper in whose surface fine pits and lands that are the inverse of the fine pits and lands on the substrate have been formed.

Figure 13:
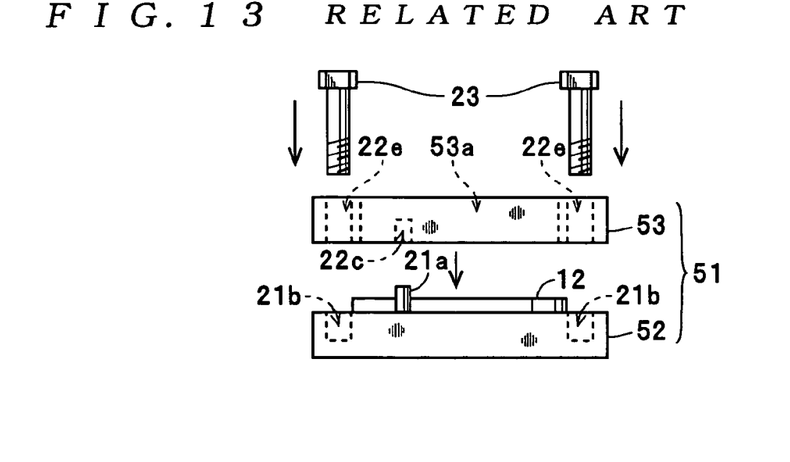
FIG. 13 is diagram showing the construction of a conventional substrate holder.
Figure 14:
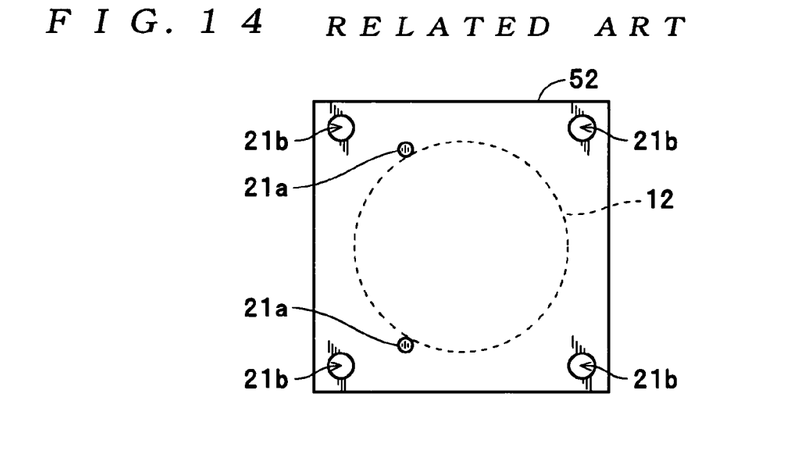
FIG. 14 is a plan view of a conventional holder main part.
Figure 15:
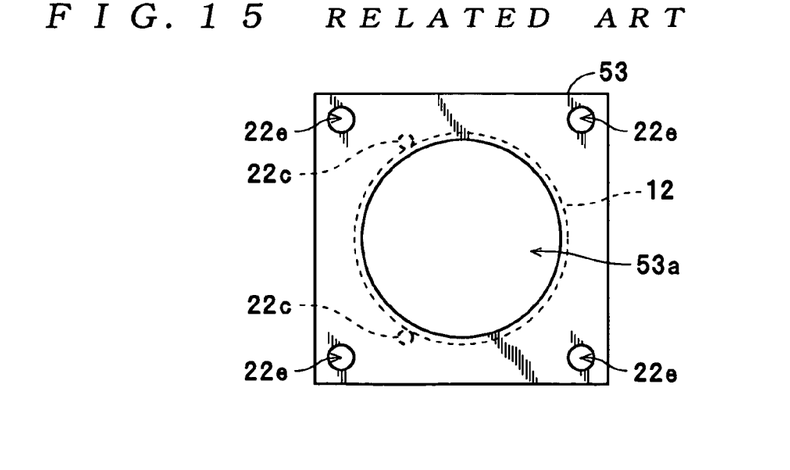
FIG. 15 is a plan view of a conventional cover.

In the energy beam irradiation apparatus in the above-mentioned application, a construction where a body to be irradiated with energy beams is attached by a suction means is used as the support part for supporting the body to be irradiated with energy beams, though the body to be irradiated can be supported by other constructions using means that do not attach the body using suction. For example, as shown in FIG. 13, a construction where a substrate 12 as a body to be irradiated with energy beams is attached to a substrate holder 51 and held between a holder main part 52 and a cover 53 of the substrate holder 51 is also in common use. In this case, as shown in FIG. 14, the holder main part 52 is formed as a square flat plate, for example, and positioning pins 21a, 21a for arranging and positioning the substrate 12 are erected on the upper surface thereof. Also, female-threaded holes 21b, 21b into which conductive fastening bolts 23, 23, . . . (see FIG. 13) are screwed are respectively formed in the four corners of the holder main part 52. On the other hand, as shown in FIG. 15, the cover 53 is formed in the same shape as the holder main part 52 and a circular hole 53a with a smaller diameter than the substrate 12 is formed in a central part thereof. Insertion holes 22c, 22c into which end parts of the respective positioning pins 21a, 21a of the holder main part 52 are inserted are also formed in a surface of the cover 53 that faces the holder main part 52. In addition, insertion holes 22e, 22e, . . . through which the fastening bolts 23, 23, . . . pass are respectively formed in the four corners of the cover 53.

When the substrate 12 is attached to the substrate holder 51, as shown in FIG. 13, first the substrate 12 is attached to the holder main part 52. At this time, as shown by the broken line in FIG. 14, the outer edge of the substrate 12 contacts the respective positioning pins 21a, 21a so that the substrate 12 is positioned at a predetermined mounting position. By doing so, the center of the substrate 12 is aligned with a center of the mounting position. Next, the ends of the respective positioning pins 21a, 21a are inserted into the respective insertion holes 22c, 22c so that the cover 53 covers the holder main part 52. By doing so, relative displacements between the holder main part 52 and the cover 53 are prevented. Next, the fastening bolts 23, 23, . . . pass through the insertion holes 22e, 22e, . . . of the cover 53 and the ends of the fastening bolts 23, 23, . . . are screwed into the female-threaded holes 21b, 21b . . . At this time, since the circular hole 53a of the cover 53 is formed with a smaller diameter than the substrate 12, an outer edge on the upper surface of the substrate 12 contacts the rim of the circular hole 53a on the lower surface of the cover 53 around an entire circumference of the rim. In this way, the substrate 12 is attached to the substrate holder 51 so as to be held between the holder main part 52 and the cover 53.

Next, the substrate holder 51 to which the substrate 12 has been attached is fixed at a predetermined position on a moving stage (composed of a rotating table or an X-Y table) of an energy beam irradiating apparatus. In this case, the substrate holder 51 is correctly fixed at the predetermined position on the moving stage and a center of the mounting position of the substrate holder 51 is aligned with a reference point in a coordinate system (such as an X-Y coordinate system) set in advance on the moving stage. After this, the energy beam irradiating apparatus causes the moving stage to move according to a predetermined movement pattern while carrying out irradiation with an energy beam. In this case, the movement pattern is regulated with the above-mentioned reference point that is set on the moving stage as a reference. For example, the movement pattern is regulated using relative coordinate data in the above-mentioned X-Y coordinate system with the reference point as a reference. This means that when the substrate 12 has been correctly attached to the mounting position of the substrate holder 51 and the substrate holder 51 has been correctly attached to the predetermined position on the moving stage, an irradiation pattern (latent image) corresponding to the movement pattern set with the reference point set on the moving stage as a reference is correctly formed on the resist layer formed on the surface of the substrate 12 by irradiation with the energy beam with the center of the substrate 12 as a reference.

However, by investigating an energy beam irradiating apparatus with the above substrate holder 51, the inventors of the present invention discovered the following problem. That is, since the above energy beam irradiating apparatus is constructed so that the substrate 12 is positioned by two positioning pins 21a, 21a, when the holder main part 52 is covered with the cover 53, there is the possibility of the substrate 12 becoming displaced in a direction moving away from the respective positioning pins 21a, 21a. In this case, the displacement of the center of the substrate 12 with respect to the center of the mounting position results in the center of the substrate 12 becoming displaced with respect to the reference position of the moving stage. Accordingly, there is the problem that it becomes difficult for the energy beam irradiating apparatus to correctly form the irradiation pattern on the substrate 12 with the center of the substrate 12 as a reference. Also, even when the substrate 12 has been correctly attached to the mounting position of the substrate holder 51, there are cases where the substrate holder 51 is fixed at a position displaced from the predetermined position on the moving stage. This means that in such cases also, the center of the substrate 12 is displaced with respect to the reference position on the moving stage, so that it is difficult to correctly form the irradiation pattern on the substrate 12 with the center of the substrate 12 as a reference.

On the other hand, when a stamper for a discrete track medium is manufactured, for example, it is necessary to form a predetermined irradiation pattern (latent image) in the form of a plurality of concentric circles on the resist layer formed on the surface of the substrate 12 with the center of the substrate 12 as a reference and an eccentricity with respect to the center of the substrate 12 of ±10 μm or less. However, the respective displacements that are actually produced when the above substrate 12 is mounted on the substrate holder 51 and when the substrate holder 51 is fixed on the moving stage can result in a displacement of up to around 300 μm between the center of the substrate 12 and the reference point of the moving stage. In this case, the center of an irradiation pattern formed on the resist pattern of the substrate 12 will be displaced by around 300 μm from the center of the substrate 12, so that improvements are desired. Also, when a discrete track medium manufactured using a stamper produced under the above conditions is loaded in a recording/reproduction apparatus, there is also the problem that the time during which a magnetic head can follow a track becomes short.

SUMMARY OF THE INVENTION

The present invention was conceived in view of the above problems and it is a principal object of the present invention to provide an energy beam irradiating apparatus that can correctly form a predetermined irradiation pattern on a disc-like substrate through irradiation with an energy beam with the center of the disc-like substrate as a reference, even when the disc-like substrate has been attached to a substrate holder in a displaced state and/or the substrate holder has been attached to a moving stage in a displaced state.

To achieve the stated object, an energy beam irradiating apparatus according to the present invention includes: a substrate holder to which a disc-like substrate is attached, including a holder main part on which the disc-like substrate is mounted and a pressing plate, the disc-like substrate being held between the holder main part and the pressing plate with a formation region of an irradiation pattern on the disc-like substrate and a partial region of at least one of an outer edge and an inner edge of the disc-like substrate being exposed; a moving stage that moves the substrate holder; an energy beam irradiating mechanism that irradiates a surface of the disc-like substrate attached to the substrate holder with an energy beam; and a control unit that causes the moving stage to move based on a movement pattern with a reference point set in advance on the moving stage as a reference so that an irradiation pattern is formed on the surface of the disc substrate by irradiation with the energy beam, the control unit calculating, during formation of the irradiation pattern, a center of the disc-like substrate based on at least one part of an outline of the exposed outer edge or inner edge of the disc-like substrate and setting the calculated center as the reference point.

According to this energy beam irradiating apparatus, the control unit calculates a center of the disc-like substrate based on at least one part of an outline of the exposed outer edge or inner edge of the disc-like substrate and causes the moving stage to move with the calculated center as a reference point for the movement pattern of the moving stage, so that even when the disc-like substrate has been attached to the substrate holder in a displaced state and/or the substrate holder has been attached to a moving stage in a displaced state, it is possible to move the disc-like substrate using a movement pattern that has the center of the disc-like substrate as a reference, resulting in it being possible to correctly form an irradiation pattern corresponding to the movement pattern on the disc-like substrate through irradiation with an energy beam.

In this case, it is preferable for at least one positioning pin that regulates movement of the disc-like substrate attached to the substrate holder to be disposed on at least one of the substrate holder and the pressing plate. According to this preferred aspect, movement of the disc-like substrate within the substrate holder can be regulated, and as a result, for example during a fastening operation for the holder main part and the pressing plate using fastening bolts, it is possible to prevent large displacements of the disc-like substrate from occurring within the substrate holder.

It is also preferable for the energy beam to be an electron beam and the pressing plate to be formed using a conductive material. According to this preferred aspect, when a disc-like substrate, on whose outer edge or inner edge a conductive film is formed, is irradiated with an energy beam, the outer edge or inner edge of the disc-like substrate is electrically connected to the pressing plate, so that charge generated in the surface due to irradiation with an electron beam can be discharged to earth or the like via the outer edge or inner edge of the disc-like substrate and the conductive pressing plate. As a result, it is possible to prevent the surface of the disc-like substrate from becoming charged from the outset.

It should be noted that the disclosure of the present invention relates to a content of Japanese Patent Application 2003-079362 that was filed on 24 Mar. 2003 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereafter, preferred embodiments of an energy beam irradiating apparatus according to the present invention will be described with reference to the attached drawings. As one example, a case where an irradiation pattern (latent image) composed of a plurality of concentric circles is formed on a resist layer (not shown) formed on the surface of a substrate by an energy beam irradiating apparatus when manufacturing a stamper for a discrete track medium will be described.

First, the construction of the energy beam irradiating apparatus will be described with reference to the drawings.

Figure 1:
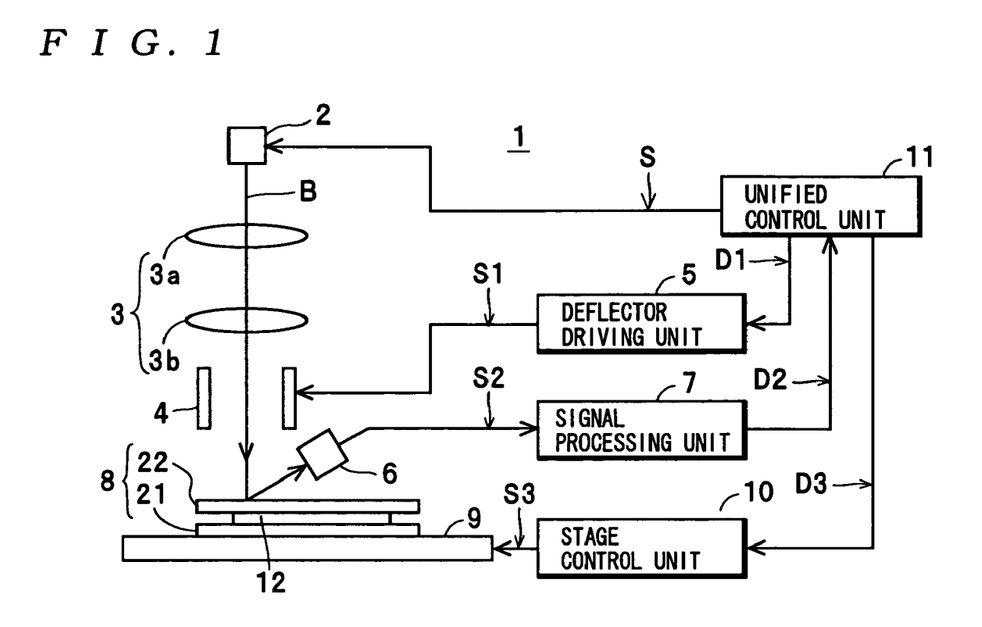
FIG. 1 is a block diagram showing the construction of an energy beam irradiating apparatus according to an embodiment of the present invention.

As shown in FIG. 1, an energy beam irradiating apparatus 1 includes an electron gun 2, an electron beam control mechanism 3, a deflector 4, a deflector driving unit 5, a detector 6, a signal processing unit 7, a substrate holder 8, a moving stage 9, a stage control unit 10, and a unified control unit (control unit) 11, and is constructed so that a latent image formed of a plurality of concentric circles can be formed on a resist layer (not shown) formed on a surface of a substrate 12 by irradiating the substrate 12 attached to the substrate holder 8 with an electron beam B. It should be noted that the electron gun 2, the electron beam control mechanism 3, the deflector 4, the detector 6, the substrate holder 8, and the moving stage 9 are disposed inside an evacuated chamber.

As shown in FIG. 1, the electron gun 2 emits an electron beam B when an operation signal S is inputted. The electron beam control mechanism 3 includes a plurality (for example, two) of electron lenses 3a, 3b and has a function for focusing the electron beam B emitted from the electron gun 2 to irradiate the substrate 12. The deflector driving unit 5 generates a deflection signal S1 based on inputted deflection data D1 and outputs the deflection signal S1 to the deflector 4 to control a deflection operation by the deflector 4 for the electron beam B and thereby change an irradiation position on the substrate 12 of the electron beam B. The electron gun 2, the electron beam control mechanism 3, the deflector 4, and the deflector driving unit 5 compose an energy beam irradiating mechanism according to the present invention.

As shown in FIG. 1, the detector 6 detects reflected electrons (secondary electrons) when the substrate 12 is scanned with the electron beam B and outputs a detection signal S2. The signal processing unit 7 receives an input of the detection signal S2 and converts the detection signal S2 to detection data D2 which is outputted. In this case, since the detection data D2 shows the reflected electron intensity for a scanning position of the electron beam B, a form (an outline of an outer edge, for example) of the substrate 12 can be determined based on this detection data D2.

Figure 2:
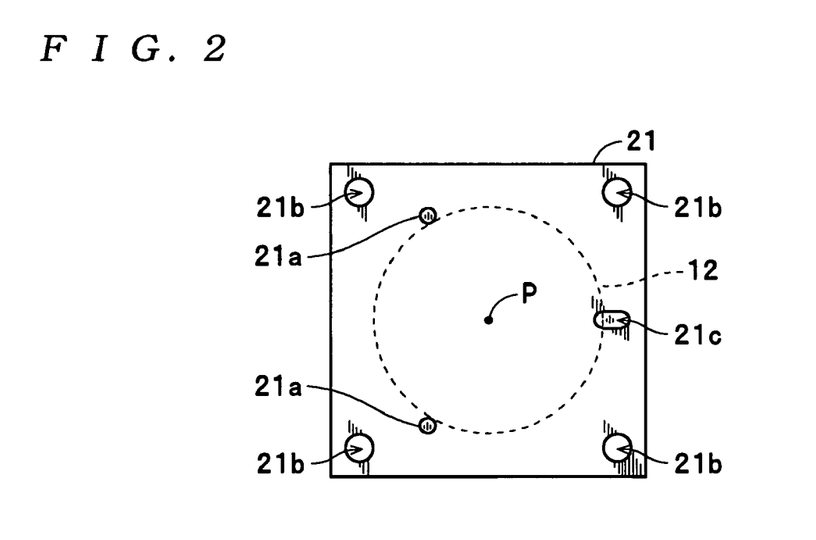
FIG. 2 is plan view of a holder main part.

As shown in FIG. 1, the substrate holder 8 is composed of a holder main part 21 and a cover 22 as a pressing plate. In this case, as shown in FIG. 2, the holder main part 21 is formed as a square flat plate, for example, with two positioning pins (regulating pins) 21a, 21a for positioning the substrate 12 being erected on a surface of the holder main part 21. Also, female-threaded holes 21b, 21b, . . . that engage fastening bolts are provided with one in each of the four corners of the holder main part 21. In addition, a single recessed part 21c whose planar form is oval is formed in an upper surface of the holder main part 21. In this case, the respective positioning pins 21a, 21a and the recessed part 21c are disposed for example at intervals of about 120° in a periphery of and centered on a center P of a mounting position at which the substrate 12 is mounted (putting this another way, the center of a circle (outline) produced by an outer edge of the substrate 12 when the substrate 12 has been correctly mounted at the mounting position).

Figure 3:
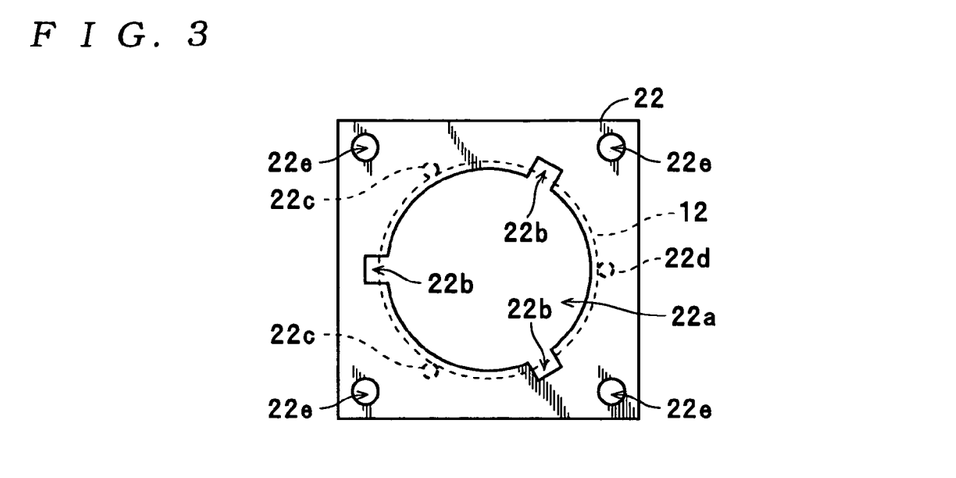
FIG. 3 is plan view of a cover.

On the other hand, as shown in FIG. 3, the cover 22 is formed of a plate in the same shape as the holder main part 21. Although not a limitation, the cover 22 is formed of a conductive material (a conductive metal material). A circular hole 22a with a smaller diameter than the substrate 12 is formed in a central part of the cover 22. In addition, three rectangular cutaway parts 22b that are centered on a center of the circular hole 22a are formed at intervals of 120° in an edge part of the circular hole 22a of the cover 22. Accordingly, when the substrate 12 that has been mounted on the holder main part 21 has been covered with the cover 22, the outer edge of the substrate 12 is exposed via the cutaway parts 22b. Insertion holes 22c, 22c into which ends of the respective positioning pins 21a, 21a of the holder main part 21 can be respectively inserted are also formed in a surface of the cover 22 that faces the holder main part 21. A positioning pin (regulating pin) 22d is also erected on this facing surface of the cover 22 at a position corresponding to the recessed part 21c of the holder main part 21. In this case, in concert with the respective positioning pins 21a, 21a the positioning pin 22d regulates movement of the substrate 12 that has been mounted on the holder main part 21 in all directions (all directions on the holder main part 21) within a minute amount. Through-holes 22e, 22e, . . . through which fastening bolts 23 pass are also formed in the four corners of the cover 22.

As shown in FIG. 1, the stage control unit 10 generates a movement signal S3 based on inputted position data D3 and outputs the movement signal S3 to the moving stage 9, thereby causing the substrate holder 8 that has been attached on the moving stage 9 to move to an arbitrary position corresponding to the position data D3. In this case, the moving stage 9 is constructed of an X-Y stage, for example.

The unified control unit 11 includes a CPU and a memory (neither is shown) and controls other construction elements of the energy beam irradiating apparatus 1. Operation programs for a CPU and a movement pattern for the moving stage 9 are stored in advance in the memory. In this case, a movement pattern is stored as relative coordinate data with a predetermined point (reference point) as a reference in an X-Y coordinate system set in advance for the moving stage 9. More specifically, the movement pattern is regulated so that an irradiation pattern in the form of a plurality of concentric circles centered on the center of the substrate 12 is formed on the resist layer of the substrate 12 by irradiating an electron beam B with the moving stage 9 having been moved in accordance with the movement pattern and the center of the substrate 12 mounted on the moving stage 9 being aligned with the reference point. The CPU has a function that calculates a position of a center O of the substrate 12 in the X-Y coordinate system on the moving stage 9 by determining the form of the substrate 12 based on inputted detection data D2, a function that substitutes the calculated center O of the substrate 12 into the reference point in the movement pattern, generates position data D3 that can form an irradiation pattern in the form of a plurality of concentric circles centered on the center O, and outputs the position data D3 to the stage control unit 10, and a function that generates deflection data D1 for controlling fine deflection of the electron beam B and outputs such data as the deflection data D1 to the deflector driving unit 5.

Next, the process by which the energy beam irradiating apparatus 1 forms an irradiation pattern in a resist layer on the substrate 12 will now be described with reference to the drawings. It should be noted that the resist layer is formed in advance on the surface of the substrate 12.

Figure 4:
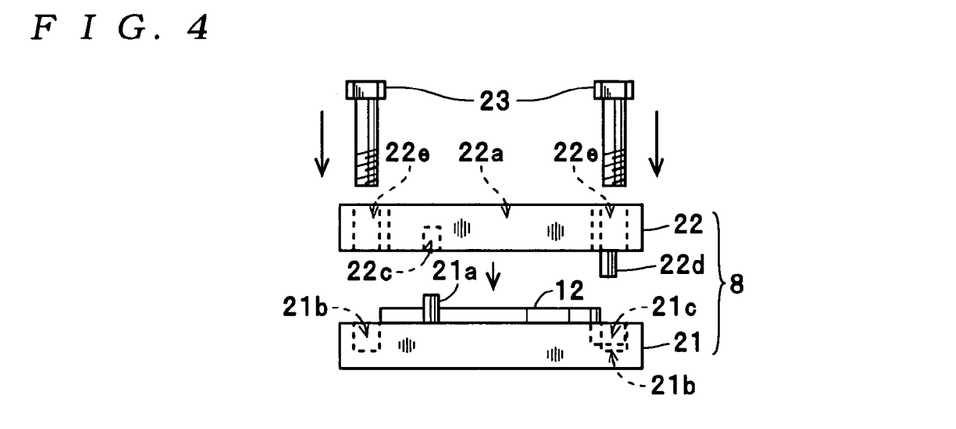
FIG. 4 is a diagram useful in explaining a procedure for attaching a substrate to a substrate holder.
Figure 5:
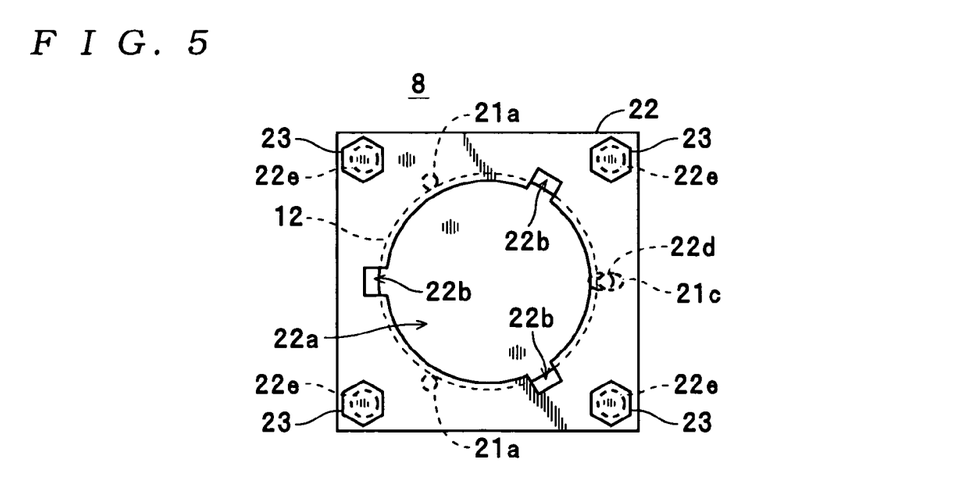
FIG. 5 is a plan view of a substrate holder to which the substrate has been attached.

First, the substrate 12 is attached to the substrate holder 8. More specifically, as shown in FIG. 4, the substrate 12 is mounted on the holder main part 21. At this time, as shown by the broken line in FIG. 2, the outer edge of the substrate 12 is made to contact the respective positioning pins 21a, 21a, so that the substrate 12 is positioned and mounted at a predetermined mounting position. Next, the holder main part 21 is covered with the cover 22. In this case, the recessed part 21c into which the positioning pin 22d on the cover 22 is inserted is formed so as to be oval-shaped in planar form and therefore is constructed so that a certain degree of displacement of the positioning pin 22d with respect to the recessed part 21c is allowed. Accordingly, by positioning and inserting the respective positioning pins 21a, 21a into the respective insertion holes 22c, 22c, the three positioning pins 21a, 21a, 22d can be simultaneously inserted into the respective insertion holes 22c, 22c and the recessed part 21c without having to position the positioning pin 22d and the recessed part 21c. In a state where the holder main part 21 is covered with the cover 22, the movement of the substrate 12 in all directions (movement in all directions on the surface of the holder main part 21) is regulated by the three positioning pins 21a, 21a, 22d disposed around the substrate 12. Since the positioning pins 21a, 21a are inserted into the insertion holes 22c, 22c, relative displacement of the holder main part 21 and the cover 22 is also regulated. Next, the fastening bolts 23, 23 are fed through the respective through-holes 22e, 22e, . . . of the cover 22 and ends of the fastening bolts 23 are screwed into the respective female-threaded holes 21b, 21b, . . . of the holder main part 21. In this case, as shown in FIG. 5, since the circular hole 22a of the cover 22 is formed with a smaller diameter than the substrate 12, an outer edge on the upper surface of the substrate 12 contacts the rim (an edge where the cutaway parts 22b are not formed) of the circular hole 22a on the lower surface of the cover 22. By doing so, the substrate 12 is attached to the substrate holder 8 in a state where the substrate 12 is held between the holder main part 21 and the cover 22. In this state, as shown in FIG. 5, arc-shaped parts of an outer edge outline of the substrate 12 are exposed via the respective cutaway parts 22b, 22b, 22b, and a formation region of the irradiation pattern on the substrate 12 is exposed via the circular hole 22a.

Next, the substrate holder 8 to which the substrate 12 has been attached is mounted at a predetermined position on the moving stage 9 of the energy beam irradiating apparatus 1. After this, in the energy beam irradiating apparatus 1, the unified control unit 11 starts a process for calculating a position of the center O of the substrate 12 in the X-Y coordinate system of the moving stage 9. In this process, the unified control unit 11 outputs the operation signal S and causes the electron gun 2 to start emitting the electron beam B, as well as controlling the stage control unit 10 and the deflector driving unit 5 by outputting the position data D3 and the deflection data D1, so that the electron beam B scans the positions of the cutaway parts 22b formed in the cover 22. By inputting the detection data D2 outputted from the detector 6 that detected reflected electrons (secondary electrons) during scanning, the unified control unit 11 detects outer edges E1, E2, E3 (see FIG. 6) of the substrate 12 exposed via the cutaway parts 22b based on the values of the detection data D2. At this time, based on the detection data D2, the unified control unit 11 finds coordinate data of respective detected outlines of the outer edges E1, E2, E3 of the substrate 12 exposed via the cutaway parts 22b, and stores the coordinate data in the memory.

Figure 6:
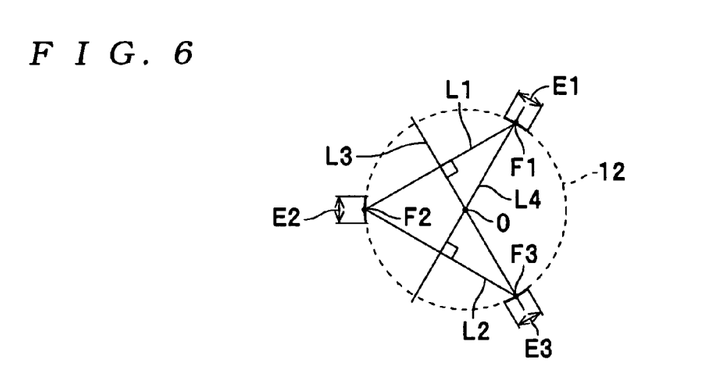
FIG. 6 is a diagram useful in explaining a process by which the energy beam irradiating apparatus calculates a center of a substrate.

Next, as shown in FIG. 6, the unified control unit 11 sets virtual points F1, F2, F3 on the outlines of the respective outer edges E1, E2, E3 of the substrate 12 that have been stored. After this, the unified control unit 11 calculates the center O of the substrate 12 based on the respective virtual points F1, F2, F3. More specifically, the unified control unit 11 finds a line segment L1 that joins the two virtual points F1 and F2 and a line segment L2 that joins the two virtual points F2 and F3. After this, once perpendicular bisectors L3 and L4 have been respectively calculated for the line segments L1 and L2, the center O of the substrate 12 is calculated by finding an intersection of the perpendicular bisectors L3 and L4.

Next, the unified control unit 11 outputs the operation signal S, thereby causing the electron gun 2 to start emitting the electron beam B, and also generates the position data D3 and the deflection data D1 based on the movement pattern that has the calculated center O of the substrate 12 as a reference point. The unified control unit 11 controls the stage control unit 10 based on the generated movement pattern and controls the deflector driving unit 5 by outputting the deflection data D1. By doing so, the electron beam B is emitted in a plurality of concentric circles with the center O of the substrate 12 as a center (reference), resulting in a latent image composed of a plurality of concentric circles centered on the center O of the substrate 12 being correctly formed in the resist layer formed on the surface of the substrate 12. On the other hand, charge generated due to irradiation with the electron beam B can cause the resist layer on the substrate 12 to become charged.

In this case, since the cover 22 of the energy beam irradiating apparatus 1 is formed of a conductive material, when the substrate 12 that has a conductive film formed on an outer edge is irradiated with the electron beam B, the outer edge of the substrate 12 and the cover 22 are electrically connected, so that the charge generated in the resist layer is reliably discharged to earth or the like via the outer edge of the substrate 12 and the cover 22. Accordingly, it is possible to prevent the surface of the substrate 12 from becoming charged from the outset.

In this way, according to the energy beam irradiating apparatus 1, a circular hole 22a that exposes an irradiation pattern formation region and three cutaway parts 22b, 22b, 22b for exposing arc-shaped parts of an outer edge of the substrate 12 are formed in the cover 22 of the substrate holder 8. Based on the outline of the outer edge of the substrate 12 exposed via the respective cutaway parts 22b, 22b, 22b, the unified control unit 11 calculates the center O of the substrate 12, and controls the operation of the moving stage 9 and the deflector 4 with the calculated center O as the reference point for the movement pattern of the moving stage 9. By doing so, even when the substrate 12 has been attached to the substrate holder 8 in a displaced state and/or the substrate holder 8 has been attached in a displaced state on the moving stage 9, it is still possible to correctly form the irradiation pattern (latent pattern), which is composed of a plurality of concentric circles centered on the center of the substrate 12, on the resist layer.

Also, according to the energy beam irradiating apparatus 1, the movement of the substrate 12 in all directions within the substrate holder 8 can be controlled by two positioning pins 21a, 21a formed on the holder main part 21 and the positioning pin 22d formed on the cover 22, resulting in it being possible to prevent large displacements of the substrate 12 within the substrate holder 8 during a fastening operation of the fastening bolts 23, 23, . . . According to the energy beam irradiating apparatus 1, since the outer edge of the substrate 12 can definitely be exposed via the respective cutaway parts 22b, 22b, 22b, the process that calculates the position of the center O of the substrate 12 can always be correctly carried out. As a result, an irradiation pattern (latent image) composed of a plurality of concentric circles centered on the center O of the substrate 12 can always be correctly formed on the resist layer.

It should be noted that the present invention is not limited to the above-described embodiment. For example, although an example where the positioning pin 22d formed on the cover 22 has a cylindrical shape has been described in the above embodiment, this is not a limitation for the present invention, and the positioning pin 22d may be formed of a flat plate. Also, although an example where the positioning pins 21a, 21a are formed on the holder main part 21 and the positioning pin 22d is formed on the cover 22 has been described, the three positioning pins may be formed together on one of the holder main part 21 and the cover 22. In this case, insertion holes for the positioning pins are formed in the other of the holder main part 21 and the cover 22. In addition, at least one out of the three positioning pins can be formed so as to slide in a radial direction of the substrate 12.

Figure 7:
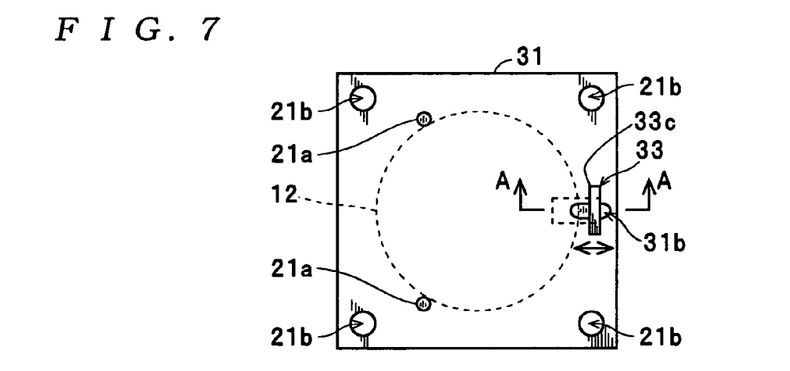
FIG. 7 is a plan view of a holder main part according to another embodiment.
Figure 8:
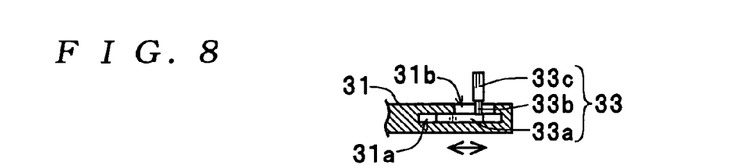
FIG. 8 is a cross-sectional view taken along a line A—A in FIG. 7.
Figure 9:
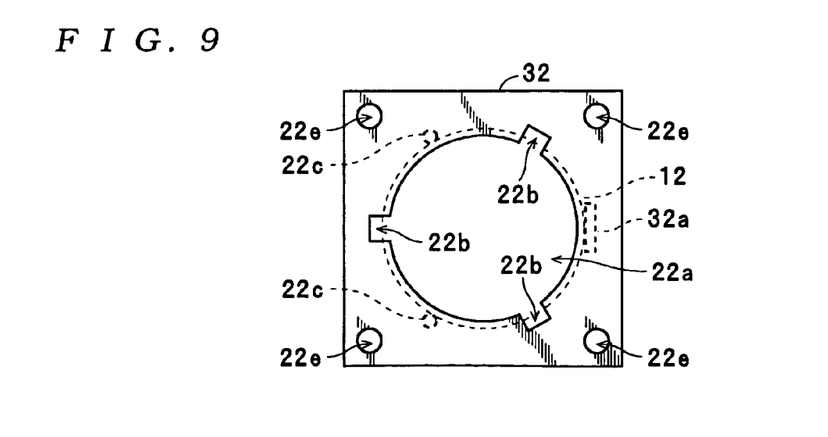
FIG. 9 is a plan view of a cover used together with the holder main part shown in FIG. 7.

More specifically, as one example, a holder main part 31 and a cover 32 will now be described with reference to FIGS. 7 to 9. It should be noted that parts that are the same as the holder main part 21 and the cover 22 have been given the same reference numerals and description thereof is omitted. In this case, a positioning pin 33 is disposed at a formation position of the recessed part 21c of the holder main part 21 on the holder main part 31. More specifically, as shown in FIG. 8, a cavity 31a is formed inside the holder main part 31 at an arrangement position of the positioning pin 33, and, as shown in FIGS. 7 and 8, an oval through-hole 31b that passes through the holder main part 31 to the cavity 31a is formed in the surface of the holder main part 31 at this arrangement position. As shown in FIGS. 7 and 8, the positioning pin 33 is composed of a sliding member 33a that is disposed inside the cavity 31a so as to be freely slidable along a radial direction (a direction shown by the arrows in the drawings) of the substrate 12, a linking pin 33b that projects out from the sliding member 33a and is inserted into the through-hole 31b, and a plate-like positioning pin main part 33c that is attached to an upper end of the linking pin 33b and extends from a surface of the holder main part 31 at a right angle. On the other hand, as shown in FIG. 9, an insertion hole 32a into which an end of the positioning pin 33 (an end of the positioning pin main part 33c) can be inserted is formed in the cover 32 at a position at which the positioning pin 22d is formed on the cover 22.

When attaching the substrate 12 to a substrate holder that uses the holder main part 31 and the cover 32, first the positioning pin main part 33c is moved to an outer edge side of the holder main part 31 and after this the substrate 12 is mounted between the positioning pins 21a, 21a, 33. In this case, the gap between the positioning pins 21a, 21a and the positioning pin 33 is formed wide so as to leave a certain degree of room with respect to the diameter of the substrate 12, so that the substrate 12 can be mounted easily on the holder main part 31. Next, the positioning pin main part 33c of the positioning pin 33 is caused to slide towards the substrate 12 and the substrate 12 is positioned at the mounting position by the respective positioning pins 21a, 21a, 33. Finally, the ends of the respective positioning pins 21a, 21a, 33 are inserted into the respective corresponding insertion holes 22c, 22c, 32a of the cover 32 so that the holder main part 31 is covered with the cover 32. In this state, movement of the substrate 12 in all directions is regulated by the respective positioning pins 21a, 21a, 33. Accordingly, even when a substrate holder using a holder main part 31 and a cover 32 is used, it is possible to sufficiently prevent displacement of the substrate 12 in the same way as with the substrate holder 8.

In addition, in the present embodiment, although a construction is used where three cutaway parts 22b, 22b, 22b are formed in the cover 22, one virtual point F1, F2, F3 is respectively set for the outlines of the outer edge of the substrate 12 exposed via each of the cutaway parts 22b, 22b, 22b, and the center O of the substrate 12 is calculated, for example it is possible to reduce the number of cutaway parts 22b by using a construction where one cutaway part 22b is made wider in a circumferential direction of the substrate 12 and a plurality of reference points are set inside this cutaway part 22b. More specifically, when two reference points are set in a single cutaway part 22b, the number of cutaway parts 22b formed in the cover 22 can be reduced to two, and when three reference points are set in a single cutaway part 22b, the number of cutaway parts 22b can be reduced to one.

Also, although the energy beam irradiating apparatus 1 that emits an electron beam as one example of an energy beam has been described, it should be obvious that the present invention can be applied to an energy beam irradiating apparatus that emits an energy beam aside from an electron beam, such as a UV beam or a laser beam. In addition, although an example of an energy beam irradiating apparatus 1 equipped with three positioning pins for regulating movement of the substrate 12 has been described, the present invention can be applied to a construction with more than three positioning pins. Also, it should be obvious that the positioning pins can be disposed on either of the holder main part 21 (31) and the cover 22 (32).

Also, in the embodiment described above, although an example of a construction where a pressing plate is formed on the cover 22 (32) and the outer edge of the substrate 12 is held between the holder main part 21 and the pressing plate to attach the substrate 12 to the substrate holder 8 has been described, if a center hole 12a has been formed in the substrate 12, it is possible to use a construction where the substrate 12 is attached to the substrate holder by holding an inner edge of the substrate 12 between the pressing plate and the holder main part.

Figure 10:
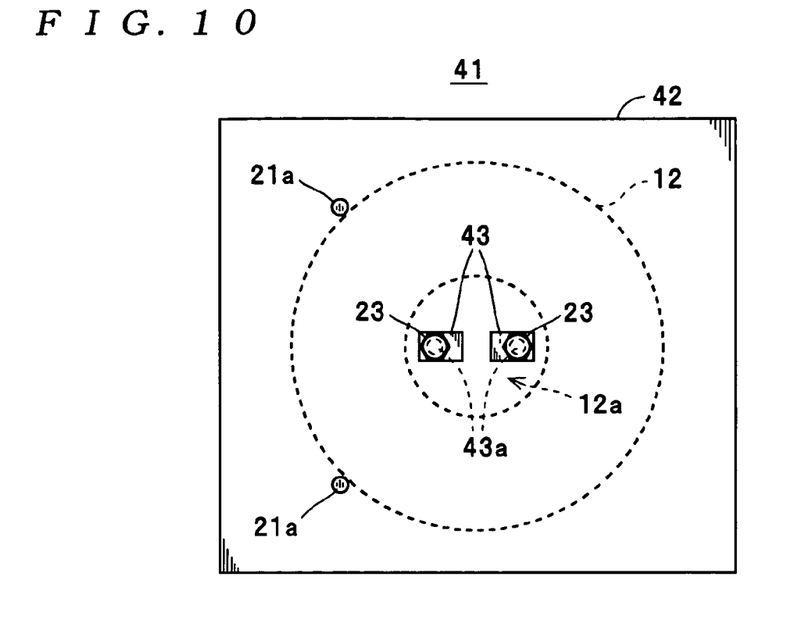
FIG. 10 is a plan view of a substrate holder according to another embodiment.
Figure 11:
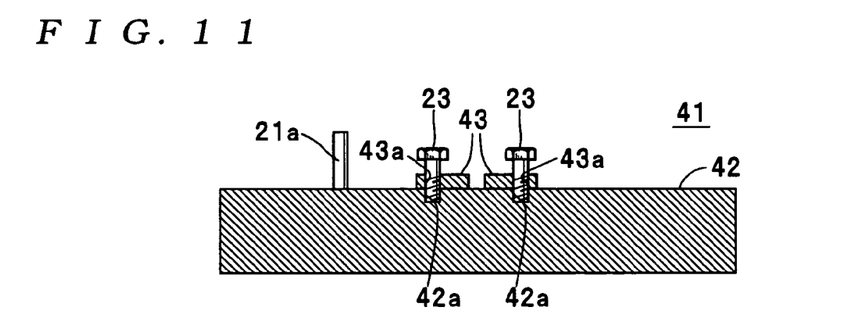
FIG. 11 is a cross-sectional view of a substrate holder shown in FIG. 10.
Figure 12:
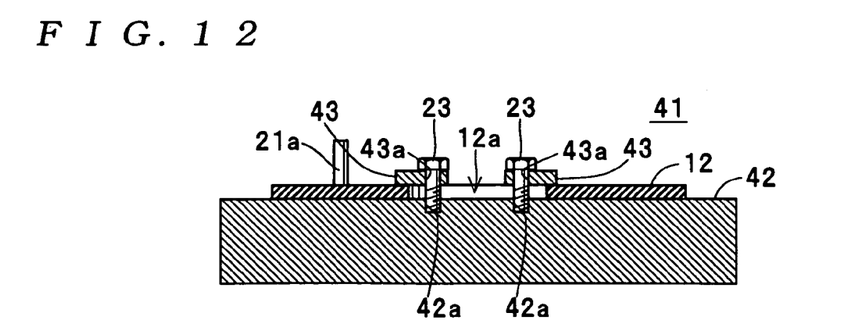
FIG. 12 is a cross-sectional view showing a state where a substrate has been attached to the substrate holder shown in FIG. 10.

More specifically, as one example, a substrate holder 41 that includes a holder main part 42 and two pressing plates 43, 43 as shown in FIGS. 10 to 12 will now be described. It should be noted that parts of the construction that are the same as the above-described embodiment have been given the same reference numerals, and duplicated description thereof has been omitted. In this case, compared to the holder main part 21, the holder main part 42 is not provided with the female-threaded holes 21b, 21b, . . . and the recessed part 21c, but further includes two female-threaded holes 42a, 42a disposed in a central part. In this case, the female-threaded holes 42a, 42a are provided at a gap that enables simultaneous insertion into the central hole 12a formed in the substrate 12. On the other hand, the pressing plates 43, 43 are respectively constructed of flat rectangular plates in which one through-hole 43a is formed close to one end. The fastening bolts 23 are inserted into the respective through-holes 43a of the pressing plates 43, 43, and the fastening bolts 23, 23 are screwed into the female-threaded holes 42a, 42a, thereby attaching the pressing plates 43, 43 to the holder main part 42. In this case, the inner diameter of the through-hole 43a is formed larger than the outer diameter of the fastening bolts 23, so that the respective pressing plates 43, 43, when attached to the holder main part 42, are freely rotatable about the fastening bolts 23, 23. Like the cover 22, the respective pressing plates 43, 43 are formed of a conductive material.

When the substrate 12 is attached to the holder main part 41, first, as shown in FIGS. 10 and 11, the respective pressing plates 43, 43 are rotated so that end parts in opposite directions (the end parts furthest from the through-holes 43a in the length direction) respectively face the center of the holder main part 42. By doing so, the respective pressing plates 43, 43 are kept from interfering with the inner circumferential surface of the substrate 12 in which the center hole 12a is provided. Next, the substrate 12 is mounted on the holder main part 42 in a state where the outer edge contacts the respective positioning pins 21a, 21a. In this case, the respective pressing plates 43, 43 are disposed inside the center hole 12a of the substrate 12. Next, the respective pressing plates 43, 43 are lifted and simultaneously rotated by 180°, so that as shown in FIG. 12, the respective opposite end parts contact the inner edge of the substrate 12 (i.e., a rim of the center hole 12a of the substrate 12). Next, the respective fastening bolts 23, 23 are tightened, so that the substrate 12 is attached to the substrate holder 41 in a state where the substrate 12 is held between the holder main part 42 and the respective pressing plates 43, 43. When this substrate holder 41 is used, the outer edge and the inner edge of the substrate 12 are simultaneously exposed. Accordingly, virtual points F1, F2, F3 are respectively set for one of the outer edge and the inner edge of the substrate 12 and the center O of the substrate 12 is calculated. The charge generated in the resist layer due to irradiation with the electron beam B is discharged to earth or the like via the inner edge of the substrate 12 and the respective pressing plates 43, 43. It should be noted that although an example construction where the respective pressing plates 43, 43 are formed as rectangular flat plates has been described, the pressing plates 43, 43 are not limited to being rectangular and can be formed in any shape, such as an oval shape. Also, although not shown, it is also possible to use a substrate holder construction where the inner edge of the substrate 12 is fixed using the pressing plates 43, 43 and the cover 22 is used to fix the outer edge of the substrate 12.

The invention claimed is:

1. An energy beam irradiating apparatus comprising:
 a substrate holder to which a disc-like substrate is attached, including a holder main part on which the disc-like substrate is mounted and a pressing plate, the disc-like substrate being held between the holder main part and the pressing plate with a formation region of an irradiation pattern on the disc-like substrate and a partial region of at least one of an outer edge and an inner edge of the disc-like substrate being exposed;
 a moving stage that moves the substrate holder;
 an energy beam irradiating mechanism that irradiates a surface of the disc-like substrate attached to the substrate holder with an energy beam; and
 a control unit that causes the moving stage to move based on a movement pattern with a reference point set in advance on the moving stage as a reference so that an irradiation pattern is formed on the surface of the disc substrate by irradiation with the energy beam, the control unit calculating, during formation of the irradiation pattern, a center of the disc-like substrate based on at least one part of an outline of the exposed outer edge or inner edge of the disc-like substrate and setting the calculated center as the reference point.

2. An energy beam irradiating apparatus according to claim 1, wherein at least one positioning pin that regulates movement of the disc-like substrate attached to the substrate holder is disposed on at least one of the substrate holder and the pressing plate.

3. The energy beam irradiating apparatus according to claim 1, wherein the energy beam is an electron beam and the pressing plate is formed using a conductive material.

4. The energy beam irradiating apparatus according to claim 2, wherein the energy beam is an electron beam and the pressing plate is formed using a conductive material.

* * * * *